United States Patent
Bilodeau

(10) Patent No.: US 6,235,363 B1
(45) Date of Patent: May 22, 2001

(54) COMPOSITE CONSTRUCTION CONTAINING BARRIER LAYER

(75) Inventor: Wayne L. Bilodeau, Mentor, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/159,559

(22) Filed: Sep. 23, 1998

Related U.S. Application Data

(63) Continuation-in-part of application No. 09/073,572, filed on May 6, 1998, now abandoned.

(51) Int. Cl.$^7$ ............................ B32B 27/08; B32B 27/22; B32B 27/30; B32B 27/38
(52) U.S. Cl. .................. 428/40.1; 428/41.5; 428/41.8; 428/345; 428/352; 428/354; 428/355 AC; 428/414; 428/522
(58) Field of Search .................... 428/40.1, 41.3, 428/41.5, 41.8, 343, 345, 351, 352, 354, 355 AC, 413, 414, 500, 515, 518, 914, 522

(56) References Cited

U.S. PATENT DOCUMENTS

| | | | |
|---|---|---|---|
| 3,027,357 | 3/1962 | Stickle, Jr. | 260/78.5 |
| 4,210,703 * | 7/1980 | Scantlin et al. | 428/413 |
| 4,219,596 | 8/1980 | Takemoto et al. | 428/41 |
| 4,287,255 | 9/1981 | Wong et al. | 428/343 |
| 4,294,746 | 10/1981 | Blair et al. | 260/37 |
| 4,434,286 | 2/1984 | Burhans et al. | 528/297 |
| 4,532,274 | 7/1985 | Spurr | 523/457 |
| 4,584,217 | 4/1986 | McClintock | 428/40 |
| 4,622,349 | 11/1986 | Koleske et al. | 522/31 |
| 4,822,676 * | 4/1989 | Mudge | 428/343 |
| 4,871,611 | 10/1989 | LeBel | 428/266 |
| 4,977,219 | 12/1990 | Watson, Jr. | 525/329 |
| 5,037,700 | 8/1991 | Davis | 428/414 |
| 5,069,964 | 12/1991 | Tolliver et al. | 428/325 |
| 5,284,644 | 2/1994 | Hiatt | 428/40 |
| 5,424,991 * | 6/1995 | Lu | 428/352 |
| 5,532,058 | 7/1996 | Roland et al. | 428/351 |
| 5,599,651 | 2/1997 | Steinmann et al. | 430/280.1 |
| 5,612,107 | 3/1997 | Sangani et al. | 428/41.7 |
| 5,662,985 | 9/1997 | Jensen et al. | 428/195 |
| 5,667,893 | 9/1997 | Kinzer et al. | 428/413 |
| 5,714,305 | 2/1998 | Teng et al. | 430/271.1 |

OTHER PUBLICATIONS

Union Carbide Corporation, Product Literature for "Cyracure", (1995).

Section of vol. 1, Encyclopedia of Polymer Science and Engineering, 1985.*

* cited by examiner

*Primary Examiner*—Paul Thibodeau
*Assistant Examiner*—Ramsey Zacharia
(74) *Attorney, Agent, or Firm*—Renner, Otto, Boisselle & Sklar

(57) ABSTRACT

This invention relates to a composite construction for use as a label or a tape to be adhered to a second substrate comprising a rubber-based material (e.g., vehicular tire), said composite construction comprising: a first substrate (e.g., paper, polymer film or combination thereof), said first substrate having a face side and an underside opposite said face side; an adhesive layer; and a barrier layer adhered to the underside of said first substrate and positioned between said first substrate and said adhesive layer, said barrier layer comprising a radiation cured cross linked cycloaliphatic epoxide derived from at least one cycloaliphatic epoxy compound, at least one polyol and at least one photoinitiator, said barrier layer being substantially impervious to migratory components in said adhesive layer and said second substrate. In one embodiment, a release liner is adhered to the adhesive layer. In one embodiment, the composite construction is adhered to the second substrate.

11 Claims, 1 Drawing Sheet

COMPOSITE CONSTRUCTION CONTAINING BARRIER LAYER

This application is a continuation-in-part of U.S. patent for "Composite Construction Containing Barrier Layer", Ser. No. 09/073,572, filed May 6, 1998, now abandoned.

TECHNICAL FIELD

This invention relates to composite constructions comprised of a first substrate (e.g., paper, polymer film or combination thereof), an adhesive layer, and a radiation-cured cross linked cycloaliphatic epoxy barrier layer, the barrier layer being positioned between the first substrate and the adhesive layer. These composite constructions are useful as labels, tapes, and the like, for application, in one instance, to rubber-based substrates, such as vehicular tires.

BACKGROUND OF THE INVENTION

The use of labels for rubber-based substrates, such as vehicular tires and the like, is well known. The labels are typically comprised of a facestock and an adhesive layer. A release liner, which is removably adhered to the adhesive layer, is usually included with these labels. The release liner is stripped from the label when it is desired to affix the label to the rubber-based substrate. A problem with the use of these label constructions is that the adhesive layer and/or the rubber-based substrate often contain migratory components (e.g., oils, plasticizers, carbon black, and the like) that migrate to the facestock and cause distortion and/or color deterioration of the facestock. The present invention, which employs a radiation cured cross linked cycloaliphatic epoxy barrier layer between the facestock and the adhesive layer, overcomes this problem by shielding the facestock from these migratory components.

Another application for laminates is for signs on vehicles. Typically additives are placed in the facestock to help the facestock maintain its performance properties over time. The sign may be used on the side of vehicles for the purposes of advertisement, decoration, and/or information. The desirable functional features of such laminates, include the ability to conform well over rivets and corrugation (to look as though the graphics containing laminate signs were painted); offer excellent reception to various type of printing inks; tolerate a wide variation in outdoor weather conditions such as rain, solar irradiation, winter as well as summer temperatures; remove cleanly when desired from the side of these vehicles without leaving adhesive residue or film breaking due to becoming brittle and offer sufficient adhesion to various metal and painted substrates over a wide range of temperatures spanning from summer to winter months.

Additives are often added to the facestocks, such as vinyl facestocks to maintain the facestock's pliability and removability. For signs, this is particularly important since the sign needs to be conformable to the surface of vehicles. However, these additive tend to migrate to the adhesive. This migration causes the adhesive to have reduced removability. This invention concerns pressure sensitive adhesive laminates that are used to make signs. The present invention, which employs a radiation cured cross linked cycloaliphatic epoxy barrier layer between the facestock and the adhesive layer, overcomes this problem by shielding the adhesive from these migratory components.

U.S. Pat. No. 5,612,107 discloses a composite construction which comprises (A) a layer of plasticized polymer film having a face side and a back side; (B) a release-coated liner having one surface in contact with the back side of the layer of plasticized polymer film; and either (C) a plasticizer-resistant polymer backcoating on the other surface of the release-coated liner (B) which is essentially impervious to the plasticizer in (A); or (D) a removable plasticizer-resistant polymer film in contact with the face side of the layer of plasticized polymer film (A). These composite constructions are capable of being wound upon themselves in roll form and may be readily unwound for use. When unwound, the presence of mottling on the surface of the vinyl film is observed to be minimized or eliminated.

SUMMARY OF THE INVENTION

This invention relates to a composite construction for use as a label or a tape that can be adhered to a second substrate, such as a rubber-based material, the composite construction comprising: a first substrate, said first substrate having a face side and an underside opposite said face side; an adhesive layer; and a barrier layer adhered to the underside of said first substrate and positioned between said first substrate and said adhesive layer, said barrier layer comprising a radiation cured cross linked cycloaliphatic epoxide derived from at least one cycloaliphatic epoxy compound, at least one polyol and at least one photoinitiator, said barrier layer being substantially impervious to migratory components in said first substrate, said adhesive layer or said second substrate. In one embodiment, a release liner is adhered to the adhesive layer. In one embodiment, the composite construction is adhered to the second substrate.

BRIEF DESCRIPTION OF THE DRAWINGS

In the annexed drawings, like references indicate like parts or features.

DESCRIPTION OF THE PREFERRED EMBODIMENTS

Figure 1:
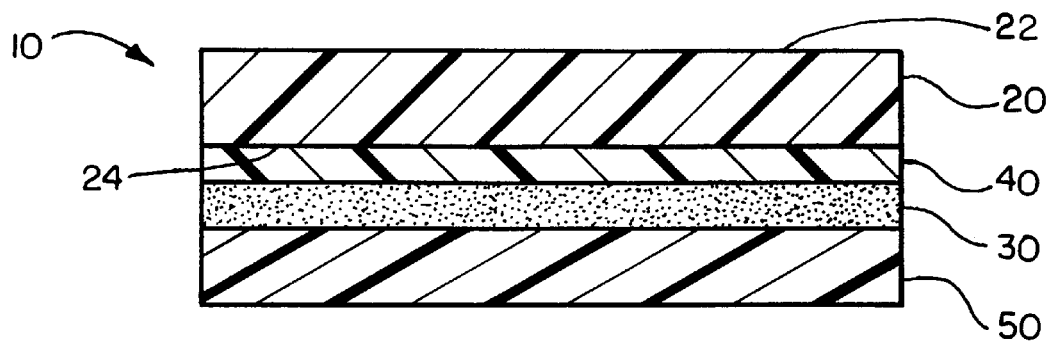
FIG. 1 is a schematic illustration of the side view of a composite construction embodying the present invention in a particular form. The composite construction is comprised of a first substrate, an adhesive layer, and a barrier layer positioned between the first substrate and the adhesive layer. A release liner is adhered to the adhesive layer.
Figure 2:
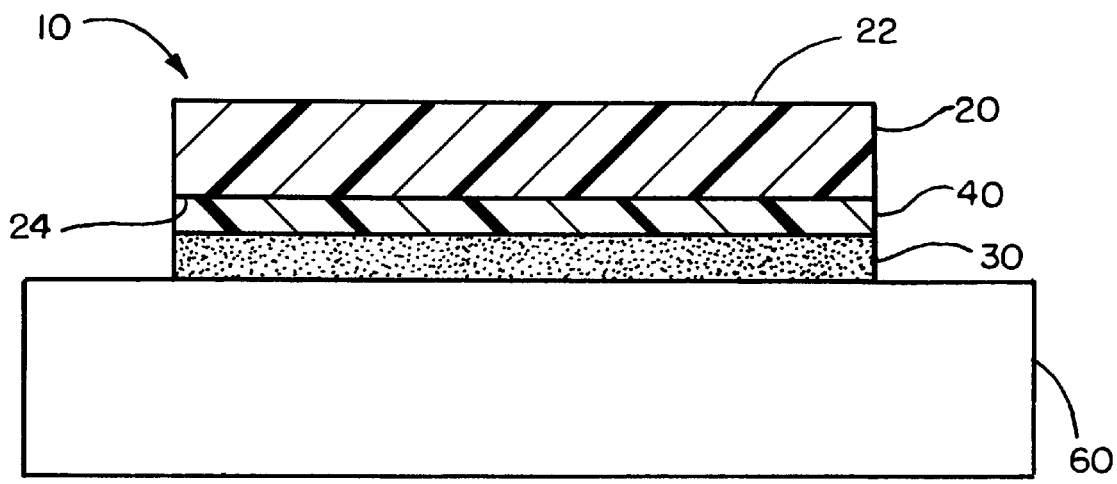
FIG. 2 is a schematic illustration of the composite construction illustrated in FIG. 1 with the exception that the release liner has been removed, and the composite construction has been adhered to a second substrate.

Referring to FIG. 1, the inventive composite construction, in its illustrated embodiment, is generally indicated by the reference numeral 10, and is comprised of: a first substrate 20, which has a face side 22 and an underside 24 opposite the face side 22; an adhesive layer 30; and a barrier layer 40 which is adhered to the underside 24 of the first substrate 20 and is positioned between the first substrate 20 and the adhesive layer 30. In one embodiment, the face side 22 is a printed or a printable surface. A release liner 50 is adhered to the adhesive layer 30. The embodiment illustrated in FIG. 2 is the same as the embodiment illustrated in FIG. 1 with exception that the release liner 50 has been removed, and the composite construction 10 has been adhered to a second substrate 60.

The First Substrate:

The first substrate can be any sheet or film intended for use as label facestock or tape. This substrate can be a polymer film, paper sheet, or combination thereof. When used as a label, the face side has a printed or a printable surface. This substrate can be a single-layered sheet or film or it can be a multi-layered construction. These include polymer films and multi-layered polymer films. The multi-layered constructions and polymer films have two or more layers, and in one embodiment about two to about seven layers, and in one embodiment about three to about five layers. The layers of such multi-layered constructions and polymer films can have the same composition and/or size or they can be different. This substrate can have any thickness that is suitable for sheets or films intended for use as labels or tapes, with thicknesses in the range of about 0.3 to about 20 mils, and in one embodiment about 0.3 to about 10 mils, and in one embodiment about 0.5 to about 5 mils, and in one embodiment about 1 to about 4 mils, being useful.

The polymer films include polyolefins (linear or branched), polyamides, polystyrenes, nylon, polyesters, polyester copolymers, polyurethanes, polysulfones, polyvinylidine chloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of á-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm3; the medium density range is from about 0.925 to about 0.940 g/cm3; and the high density range is from about 0.940 to about 0.965 g/cm3. Films prepared from blends of copolymers or blends of copolymers with homopolymers also are useful. The films may be extruded as monolayered films or multi-layered films.

In one embodiment, the first substrate is a polymeric facestock which contains migratory additives. The facestocks are preferably polyvinylidene chloride facestocks. The additives include plasticizers and antioxidants. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (Dioctyl adipate), TEG-EH plasticizer (Triethylene glycol di-2-ethylhexanoate), TOTM plasticizer (Trioctyl trimellitate), triacetin plasticizer (Glyceryl triacetate), TXIB plasticizer (2,2,4,-trimethyl-1,3-pentanediol diisobutyrate), DEP plasticizer (Diethyl phthalate), DOTP plasticizer (Dioctyl terephthalate), DMP plasticizer (Dimethyl phthalate), DOP plasticizer (Dioctyl phthalate), DBP plasticizer (Dibutyl phthalate), polyethylene oxide, toluenesulfonamide,dipropylene glycol benzoate, and the like.

The paper substrates include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

The first substrate can be a polymer-coated paper which is basically comprised of a sheet of paper that is coated on either one or both sides with a polymer coating. The polymer coating, which can be comprised of a high, medium, or low density polyethylene, polypropylene, polyester, and other similar polymer films, is coated onto the substrate surface to add strength and/or dimensional stability. The weight of these types of coated paper substrates can vary over a wide range with weights in the range of about 30 to about 100 lb/ream being useful. In total, the final coated paper substrate may be comprised of between about 10% and about 40% by weight polymer. For two-sided coatings, the quantity of polymer is approximately evenly divided between the top or face side and the bottom or underside of the paper.

The Adhesive Layer:

The adhesive layer is comprised of any pressure-sensitive or heat-activatable adhesive material known in the art for making labels, tapes and the like. These include rubber based adhesives, acrylic adhesives, vinyl ether adhesives, silicone adhesives, and mixtures of two or more thereof. The adhesives can be in the form of hot melt, solution or emulsion adhesives. Included are the pressure sensitive or heat-activatable adhesive materials described in "Adhesion and Bonding", Encyclopedia of Polymer Science and Engineering, Vol. 1, pages 476–546, Interscience Publishers, 2nd Ed. 1985, the disclosure of which is hereby incorporated by reference. The pressure sensitive or heat-activatable adhesive materials that are useful may contain as a major constituent an adhesive polymer such as acrylic-type polymers; block copolymers; natural, reclaimed, or styrene-butadiene rubbers; tackified natural or synthetic rubbers; or random copolymers of ethylene and vinyl acetate, ethylene-vinyl-acrylic terpolymers, polyisobutylene, poly(vinyl ether), etc.

Other materials in addition to the foregoing resins may be included in the pressure sensitive or heat-activatable adhesive compositions. These include solid tackifying resins, antioxidants, fillers, pigments, waxes, etc. Also included are plasticizers (often referred to as liquid tackifiers), including phthalate esters and phosphate esters. The adhesive compositions may contain various oil components such as paraffinic or aromatic oil. Naphthenic oil may present in the adhesive. Many of these components (especially the oils and plasticizers) tend to migrate to the first substrate, but are prevented from doing so by the barrier layer.

In one embodiment, the adhesives are polymers of an acrylate or methacrylate ester, a nitrogen containing monomer, an unsaturated carboxylic acid, and optionally a monomer containing cross-linkable site The polymers generally have a glass transition temperature of less than about 10°, or less than about –0°, or less than about –15° C. The polymers typically have a weight average molecular weight of at least about 200,000, preferably from about 200,000 to about 700,000. The weight average molecular weight was determined by size exclusion chromatography using polystyrene for calibration. Polymers of the instant invention may be synthesized by solution, emulsion and bulk polymerization. It is presently preferred that they be formed by solution polymerization. Polymers may be cross-linked to the desired extent, prior to use, using heat, ionic additives, catalysts, actinic or electron beam radiation and the like.

The acrylic or methacrylic ester polymers which may be prepared by polymerizing an alkyl or hydroxyalkyl acrylate or methacrylate ester, one or more of the above nitrogen containing monomers and a carboxylic acid.

The acrylate or methacrylate esters include those having from about 1 to about 24, or from about 2 to about 18, or from about 4 to about 16 carbon atoms in the ester group. The alkyl acrylate and methacrylate esters include without limitation 2-ethyl hexyl acrylate, isooctyl acrylate, butyl acrylate, sec-butyl acrylate, methyl butyl acrylate, 4-methyl-2-pentyl acrylate, isodecyl methacrylate and their hydroxy substituted analogs, and mixtures thereof. Isooctyl acrylate and 2-ethyl hexyl acrylate are particularly preferred. The acrylate ester or methacrylate esters are generally present in a major amount, e.g. greater than 50%. Typically the acrylate or methacrylate ester is present in an amount from about 55% to about 90%, or from about 60% to about 85%, or from about 65% to about 80% by weight. Here and elsewhere in the specification and claims the range and ratio limits may be combined.

The nitrogen containing monomers include N-vinyl lactams. Examples of useful nitrogen containing monomers are N-vinyl pyrrolidone, N-vinyl caprolactam, 1-vinyl-2-piperidone, 1-vinyl-5-methyl-2-pyrrolidone, and the like. N-vinyl pyrrolidone is preferred. The level of nitrogen containing monomer is generally from 10% to about 30%, or from about 8% to about 16%, or from about 10% to about 14% by weight. In one embodiment, the total level of nitrogen containing monomer is from about 15% to about 25%, or from about 10% to about 15%, or from about 11% to about 13% by weight.

In one embodiment, the pressure adhesive is prepared in the presence of an unsaturated carboxylic acid. The unsaturated carboxylic acids include acrylic acid, methacrylic acid, fumaric acid, maleic acid or anhydride, allyl acid, or mixtures. The unsaturated carboxylic acid is generally present in an amount from 0.5% to about 15%, or from about 2% to about 12%, or from about 4% to about 10% by weight.

In one embodiment, the pressure sensitive adhesive is prepared with a glycidyl monomer. The glycidyl monomer include epoxy acrylate or methacrylate esters, and glycidyl allyl esters. The glycidyl monomers are present in an amount from 0% to about 3%, or from about 0.3% to about 2%, or from about 0.5% to about 1% by weight. In one embodiment, the glycidyl monomer is present in an amount of less than about 0.5%, or less than about 0.3%, or less than about 0.2% by weight. In this embodiment, the glycidyl monomer is present at a level of at least about 0.01 % by weight.

In one embodiment, the polymers include at least one alkyl acrylate and methacrylate ester containing less than 4 carbon atoms in the alkyl group. Examples of these monomers include methyl acrylate, ethyl acrylate, methyl methacrylate, ethyl methacrylate and the like. Methyl acrylate is particularly preferred. These monomers are present in an amount from about 0% to about 35%, or from about 5% to about 30%, or from about 10% to about 25% by weight.

The polymers may include other co-polymerizable monomers. Typically these monomers are present in an amount from about 0% to about 33%, or from about 1% to about 20%, or from about 3% to about 15% by weight. These other monomers are selected to provide the desired glass transition temperature for the polymer. Other monomers include polystyryl ethyl methacrylate, acetoacetoxy ethyl methacrylate, alpha olefins (e.g. C2–8 alpha-olefins), such as ethylene, propylene and butylene, and vinyl esters of alkanoic acids containing more than three carbon atoms.

The pressure sensitive adhesives of the present invention exhibit good adhesion to high-energy surfaces such as stainless steel, aluminum and painted panels. These adhesives and blends therewith help retain the adhesive performance e.g. required for superior performance over rivet and corrugated surfaces, without compromising either the cohesive strength (important for long term removability properties) or cold temperature properties. The adhesive composition is particularly well suited for use with films like PVC that are known to often contain additives, such as plasticizers, which are capable of compromising adhesive performances. Blends of appropriate adhesive formulations, however, help overcome the cold temperature deficiency of high NVP polymers while still maintaining good aged Rivet performance and long term removability characteristics.

In one embodiment, the pressure-sensitive adhesive polymers of the present invention are prepared by co-polymerizing a mixture of monomers comprising from about 55% to about 85% by weight of an alkyl acrylate and/or methacrylate ester containing 4 to about 12 carbon atoms in the alkyl group; from about 0 to about 1% by weight of a glycidyl monomer; from about 10 to about 30% by weight, preferably from 10 to about 15% by weight of a nitrogen monomer; from 0.5% to 15% by weight, preferably from about 5 to about 15% by weight of an unsaturated carboxylic acid, most preferably from about 3 to about 8% by weight; from 0 to about 30% by weight of an alkyl acrylate and/or methacrylate ester containing less than 4 carbon atoms in the alkyl group, most preferably from about 12 to about 22% by weight, and optionally from about 0 to 33% by weight of one or more other comonomers to provide a balance of desirable polymer properties such as glass transition temperature.

The copolymers may be synthesized using solution emulsion, and bulk polymerization techniques. It is presently preferred to prepare the copolymers in solution using a mixture of solvents. The present preferred solution polymerization involves the use of blends of ethyl acetate and hexane or ethyl acetate and acetone. The ratio of solvents is adjusted to provide a reflux temperature from about 68° C. to about 78° C. The solids content during polymerization may typically range from about 30% to about 60% in order to achieve the desired weight average molecular weight, and yet achieve viscosities that are manageable in the reactor. The reaction occurs in the presence of free-radical initiators, preferably of the azo type, for example, 2,2'-azobis (isobutyronitrile). The polymers formed are solvent soluble polymers. In one embodiment, the glycidyl monomer is limited to 1% by weight of the total monomers to avoid the possibility of cross-linking, by opening of the oxirane group, during polymerization or during aging. Polymers can, as desired, be post-polymerization cross-linked using heat, catalysts, actinic or electron beam radiation and the like. The adhesive properties can, further be, manipulated and modified by additions of additives such as tackifiers, plasticizers, etc.

The following examples relate to the polymers of the present invention. Unless otherwise indicated here or throughout the specification and claims, the range and ratio limits are by weight, the temperature is room temperature in degrees Celsius and the pressure is atmospheric pressure.

EXAMPLE A

A monomer mixture is made up by mixing 216.3 g. of 2-ethyl hexyl acrylate, 40.76 g of methyl acrylate, 0.32 g. of glycidyl methacrylate, 38.04 g of N-vinyl pyrrolidone and 22.05 g of acrylic acid. A portion of (79.37 g) of this mixture is introduced to a 2-liter reactor equipped with a pitched turbine agitator, a reflux condenser and a thermistor. Also, 34.4 g. of ethyl acetate and 39.4 g of hexane are added to the reactor. The contents of the reactor are heated to reflux and 0.12 g of Vazo 64, are manufactured and sold by duPont in 5.0 g of ethyl acetate is added. After vigorous reflux started in a short time and the contents of the reactor are held for 5 minutes. At this time, the remaining monomers are mixed with 268.6 g. of ethyl acetate, 37.6 g. of hexane and 0.35 g. of Vazo 64 and are added as a single feed mixture over 3.5 hrs. All through the feed, temperature is maintained to keep reactor contents under reflux. One hour after end of feed, 0.17 g. Vazo 64 is added in 5 g. ethyl acetate and temperature is maintained for an additional hour. The percentage of solids content at the end of reaction is 47% and the viscosity is 8680 cps using #4 @ 20 on a Brookfield viscometer.

EXAMPLE B

A pressure sensitive adhesive is prepared as describe in Example A except isooctyl acrylate is used in place of 2-ethylhexyl acrylate.

The following table contains further examples of adhesives. The following examples follow the same procedure of Example A. The amount of materials is parts by weight. In the table, NVP refers to N-vinyl pyrrolidone; MeA refers to methyl acrylate; GMA refers to glycidyl methacrylate; AA refers to acrylic acid; and 2-EHA refers to 2-ethylhexyl acrylate.

| Example | NVP | MeA | GMA | AA | 2-EHA |
| --- | --- | --- | --- | --- | --- |
| C | 30 | — | — | 3.0 | 67.0 |
| D | 12 | 12.8 | 0.1 | 6.9 | 68.2 |
| E | 12 | 12.9 | — | 6.9 | 68.2 |
| F | 12 | — | 0.1 | 6.9 | 81 |
| G | 12 | 12.6 | 0.3 | 6.9 | 68.2 |
| H | 12 | — | 0.3 | 6.9 | 80.8 |
| I | 12 | 4 | 0.3 | 6.9 | 76.8 |
| J | 12 | 8 | 0.3 | 6.9 | 72.8 |
| K | 12 | 12.8 | 0.3 | 3.6 | 71.3 |
| L | 12 | 12.8 | 0.3 | 6.9 | 68 |
| M | 10 | 13.6 | 0.3 | 7 | 69.1 |
| N | 10 | 10 | 0.3 | 7 | 72.7 |
| O | 10 | 12 | 0.3 | 7 | 70.7 |
| P | 7.9 | 16.6 | 0.3 | 7 | 68.2 |
| Q | 7.9 | 16.6 | 0.3 | 6.9 | 68.3 |
| R | 7.9 | 16.9 | 0.1 | 6.9 | 68.2 |
| S | 7.9 | 12.8 | 0.3 | 7 | 72 |
| T | 8 | 12.8 | 0.3 | 3.6 | 75.3 |

The pressure sensitive adhesives of the present invention exhibit good adhesion to high-energy surfaces such as stainless steel, aluminum and painted panels. These adhesives and blends therewith help retain the adhesive performance e.g. required for superior performance over rivet and corrugated surfaces, without compromising either the cohesive strength (important for long term removability properties) or cold temperature properties. The adhesive composition is particularly well suited for use with films like PVC that are known to often contain additives, such as plasticizers, which are capable of compromising adhesive performances. Blends of appropriate adhesive formulations, however, help overcome the cold temperature deficiency of high NVP polymers while still maintaining good aged Rivet performance and long term removability characteristics.

In one embodiment, the pressure-sensitive adhesive polymers of the present invention are prepared by co-polymerizing a mixture of monomers comprising from about 55% to about 85% by weight of an alkyl acrylate and/or methacrylate ester containing 4 to about 12 carbon atoms in the alkyl group; from about 0 to about 1% by weight of a glycidyl monomer; from about 10 to about 30% by weight, preferably from 10 to about 15% by weight of a nitrogen monomer; from 0.5% to 15% by weight, preferably from about 5 to about 15% by weight of an unsaturated carboxylic acid, most preferably from about 3 to about 8% by weight; from 0 to about 30% by weight of an alkyl acrylate and/or methacrylate ester containing less than 4 carbon atoms in the alkyl group, most preferably from about 12 to about 22% by weight, and optionally from about 0 to 33% by weight of one or more other comonomers to provide a balance of desirable polymer properties such as glass transition temperature.

The copolymers may be synthesized using solution emulsion, and bulk polymerization techniques. It is presently preferred to prepare the copolymers in solution using a mixture of solvents. The present preferred solution polymerization involves the use of blends of ethyl acetate and hexane or ethyl acetate and acetone. The ratio of solvents is adjusted to provide a reflux temperature from about 68° C. to about 78° C. The solids content during polymerization may typically range from about 30% to about 60% in order to achieve the desired weight average molecular weight, and yet achieve viscosities that are manageable in the reactor. The reaction occurs in the presence of free-radical initiators, preferably of the azo type, for example, 2,2'-azobis (isobutyronitrile). The polymers formed are solvent soluble polymers. In one embodiment, the glycidyl monomer is limited to 1% by weight of the total monomers to avoid the possibility of cross-linking, by opening of the oxirane group, during polymerization or during aging. Polymers can, as desired, be post-polymerization cross-linked using heat, catalysts, actinic or electron beam radiation and the like. The adhesive properties can, further be, manipulated and modified by additions of additives such as tackifiers, plasticizers, etc.

The adhesive layer is applied to the cured barrier layer (discussed below) using known techniques. These include roller coating, curtain coating, brushing, spraying, reverse roll coating, doctor knife, dipping, die coating, offset gravure techniques, etc. The coat weight is generally in the range of about 50 to about 70 grams per square meter (gsm), and in one embodiment about 58 to about 64 gsm. The adhesive layer has a thickness of about 1.5 to about 3.5 mils, and in one embodiment about 2 to about 3 mils.

The Barrier Layer:

The barrier layer is a radiation cured cross linked cycloaliphatic epoxide derived from at least one cycloaliphatic epoxy compound, at least one polyol and at least one photoinitiator. The barrier layer is sufficiently flexible so as to not crack, split or separate when the inventive composite construction is bent or flexed during its normal use as a tape or label. The thickness of the barrier layer is sufficient to provide it with desired barrier properties. The barrier layer is impervious or substantially impervious to the migratory components in the adhesive layer and the second substrate. The term "substantially impervious" is used herein to refer to a barrier layer with at least about 90% barrier properties, and in one embodiment at least about 95%, and in one embodiment at least about 98%.

The cycloaliphatic epoxy compounds or polyepoxides that can be used are known and are described in U.S. Pat. No. 3,027,357. The portion of U.S. Pat. No. 3,027,357 beginning at column 4, line 11, to column 7, line 38, is specifically incorporated herein by reference for its disclosure of cycloaliphatic epoxy compounds that are useful. Diepoxides are especially useful. Examples include 3,4-epoxycyclohexylmethyl-3,4-epoxycyclohexane carboxylate, bis(3,4-epoxy-6-methylcyclohexylmethyl) adipate, bis(3,4-epoxycyclohexylmethyl)adipate, bis(2,3-epoxycyclopentyl)ether, vinyl cyclohexane diepoxide, 2-(3, 4-epoxycyclohexyl)-5,5-spiro(2,3-epoxycyclohexane)-m-dioxane, and the like. A commercially available cycloaliphatic epoxy resin that is useful is available under the name Cyracure UVR-6105 or Cyracure UVR-6110, both of which are products of Union Carbide identified as 3,4-epoxycyclohexylmethyl-3,4-epoxycyclohexane carboxylate.

The polyols which may be used include glycols, alkane diols, triols, tetraols, aliphatic ether containing diols, triols, tetraols, cycloaliphatic containing diols, triols, and tetraols, and aromatic containing diols, triols, and tetraols, and the like. Examples of useful polyols include the following: ethylene glycol, diethylene glycol, 2,2,4-trimethyl-1,3-pentanediol, dipropylene glycol, propylene glycol, 2,2-dimethyl-1,3-propanediol, polypropylene glycol having an average molecular weight of about 150 to about 600 and having 2 to 4 terminal hydroxyl groups, triethylene glycol, 1,4-cyclohexanedimethanol, 2,2-dimethyl-3-hydroxypropyl 2,2-dimethyl-3-hydroxy-propionate, 1,3-butanediol, tetraethylene glycol, 2,2-bis(4-hydroxphenyl)propane, and the ethylene and propylene oxide adducts of 2,2-bis(4-hydroxypheny)propane, pentaerythritol, erythritol, glycerine, trimethylolpropane, 1,4-butanediol, 1,6-hexanediol, tripropylene glycol, 2,2-bis(4-hydroxycyclohexyl)propane, 1,2,6-hexanetriol, and 1,3-propanediol. The polycaprolactone esters of polyols that can be used include those in which from about 1 to about 5, and in one embodiment from about 1.5 to about 4 moles of caprolactone are esterified with a polyol such as trimethylol propane or diethylene glycol. The polycaprolactone ester of a polyol can be the polycaprolactone ester of trimethylol propane in which about 1.5 moles of caprolactone are reacted with trimethylol propane. The polycaprolactone ester of trimethylol propane where about 3.6 moles of caprolactone are esterified with trimethylol propane can be used. Also, ester diols and ester diol alkoxylates produced by the reaction of an ester diol and an alkylene oxide can be used. A commercially available polyol that is useful is available under the name Tone 0305, which is a product of Union Carbide identified as å-caprolactone triol.

The photoinitiator can be any of the aryl sulfonium salts, iodonium salts or iron hexafluorophosphate salts known in the art as being useful as photoinitiators. Commercially available aryl sulfonium salts that are useful include Cyracure UVI-6974 and Cyracure UVI-6990, both of which are products of Union Carbide, and those available from Sartomer under the names SarCat CD 1010, SarCat CD 1011 and SarCat CD 1012. The iodonium salt available from GE Silicones under the name UV 9380C is useful. Irgacure 261, which is an iron hexafluorophosphate salt available from Ciba Geigy can be used. Oxidizing agents such as cumene hydroperoxide and sensitizers such as isopropyl thioxanthone can be used to enhance cure. The amount of photoinitiator that is used is generally about 2% to about 10% by weight based on the total weight of the barrier layer composition, and in one embodiment about 6% to about 9% by weight.

Other ingredients can be added to the cycloaliphatic epoxy composition to meet specific application requirements. A variety of other epoxides can be blended with cycloaliphatic epoxides to modify viscosity, hardness, flexibility, cure rate, adhesion, and other properties. Surfactants and waxes can be used to improve substrate wetting and surface slip. Polyol additions increase flexibility and increase depth of cure of thick coatings.

The ratio of epoxide equivalents to hydroxyl equivalents (the R value) is an important factor affecting properties of the barrier layer. Compositions with low R value (more hydroxyl equivalents) are typically more flexible and softer. The R value should generally be kept above about 2 to obtain hard, tack-free coatings. Increasing reactant equivalent weight makes compositions more flexible, extensible, and softer; decreasing reactant equivalent weight increases hardness and cure rate. In one embodiment, the value of R is in the range of about 2 to about 100, and in one embodiment about 2 to about 50, and in one embodiment about 2 to about 10.

The cycloaliphatic epoxy composition is in the form of a liquid. It is applied to the underside of the first substrate as a coating by an conventional technique known in the coating art such as roller coating, curtain coating, brushing, spraying, reverse roll coating, doctor knife, dipping, die coating, offset gravure techniques, etc. This liquid may be heated or cooled to facilitate the coating process. The coat weight is generally in the range of about 1 to about 30 gsm, and in one embodiment about 2 to about 6 gsm. The applied coating can be cured by exposure to known forms of ionizing or actinic non-ionizing radiation. Useful types of radiation include ultraviolet light, electron beam, x-ray, gamma-ray, beta-ray, etc. Ultraviolet light is especially useful. The equipment for generating these forms of radiation are well known to those skilled in the art. The cured coating has a thickness of about 1 to about 25 microns, and in one embodiment about 2 to about 6 microns.

The Release Liner:

The release liner is comprised of a backing liner and a layer of a cured release coating composition adhered to one side of the backing liner. The release coating is in contact with the adhesive layer when the release liner is adhered to the inventive composite construction. The release coating composition can be any release coating composition known in the art. Silicone release coating compositions are preferred, and any of the silicone release coating compositions which are known in the art can be used. The major component of the silicone release coating is a polyorganosiloxane and, more often, a polydimethylsiloxane. The silicone release coating composition may be room temperature cured, thermally cured, or radiation cured. Generally, the room temperature and thermally curable compositions comprise at least one polyorganosiloxane and at least one catalyst (or curing agent) for the polyorganosiloxane. These compositions may also contain at least one cure accelerator and/or adhesion promoter (sometimes referred to as an anchorage additive). As is known in the art, some materials have the capability of performing both functions, i.e., the capability of acting as a cure accelerator to increase the rate, reduce the curing temperature, etc., and also as an adhesion promoter to improve bonding of the silicone composition to the substrate.

The release coating composition is applied to the backing liner and cured using known techniques. The application techniques include gravure, reverse gravure, offset gravure, roller coating, brushing, knife-over roll, metering rod, reverse roll coating, doctor knife, dipping, die coating, spraying, curtain coating, and the like. The coat weight is generally in the range of about 0.1 gsm to about 10 gsm or more, and in one embodiment about 0.3 gsm to about 2 gsm. In one embodiment, the thickness or caliper of the resulting release-coated liner may range from about 4 mils to about 10 mils, and in one embodiment from about 4 mils to about 6 mils.

The backing liner may comprise paper, polymer film, or a combination thereof. Any of the paper, polymer films, or combinations thereof, discussed above as being useful as the first substrate can be used as the backing liner. Paper liners are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the liner. Although paper of any weight can be employed as the liner material, paper having basis weights in the range of about 30 to about 120 lb/ream are useful, and papers having basis weights in the range of from about 60 to about 100 lb/ream are particularly useful.

The Second Substrate:

The second substrate can be any substrate, such as a rubber-based substrate, to which the inventive composite construction can be adhered. In one embodiment, the second substrate is a vehicular tire. In a particularly advantageous embodiment, the first substrate is a label and the second substrate is a vehicular tire. The label is removable and can be adhered to the tire sidewall or to the tire tread. The rubber used in making the second substrate can be any known rubber or rubber-based material. These include natural rubbers, synthetic rubbers, and combinations thereof. The natural rubbers are cis-1,4-polyisoprenes, with those derived from the Hevea brasiliensis tree and quayule bush being useful. The synthetic rubbers include polybutadiene rubbers, polyisoprene rubbers, styrene-butadiene rubbers, nitrile rubbers, butyl rubbers, ethylene-propylene terpolymers, silicone rubbers, types GN, GNA, GW, FB and GRT neoprenes, polysulfide rubbers, polyacrylate rubbers, epichlorohydrin rubbers, fluoroelastomers, Hypalon (a chlorosulfonated polyethylene rubber), halogenated butyl (e.g., chlorobutyl and bromobutyl) rubbers, chlorinated polyethylene rubbers, polyurethanes, and thermoplastic rubbers.

The rubber-based substrate may contain any of the rubber compounding additives known in the art, including accelerators (e.g., the benzothiazoles such as 2-mercaptobenzothiazole), retarders (e.g.,salicyclic acid, benzoic acid, phthalic anhydride, N-nitrosodiphenylamine, N-(cyclohexylthio) phthalimide, etc.), reinforcing agents and fillers (e.g., carbon black, zinc oxide, calcium carbonate, calcium silicate, silicon dioxide, magnesium carbonate, clay, etc.), softeners and extenders (e.g., oils of various types (petroleum, vegetable, aromatic), tars, resins, pitches, synthetic organic materials, etc.), plasticizers or peptizers (e.g., pentachlorothiophenol, zinc salt of pentachlorothiophenol, 2,2$^3$-dibenzamido diphenyl disulfide, dithiobisbenzanilide, etc.) vulcanization agents and auxiliary materials (e.g., elemental sulfur, benzothiazyl disulfide, diphenylquanidine, thiuram disulfide, dicumyl peroxide, p-quinone dioxime, trinitrobenzene, chloranil, etc.), antioxidants and stabilizers (e.g., amine-type antioxidants such as ketone-amine condensation products, diaryldiamines, diarylamines and ketone-diarylamine condensation products; phosphites such as nonylphosphite and dinonylphenyl phosphite; and metal salts of dithioacids). Many of the foregoing additive materials, especially the oils, carbon black and plasticizers, tend to migrate from the rubber-based second substrate to the first substrate when the inventive composite construction is adhered to the second substrate. The barrier layer provided with the inventive composite construction is impervious or substantially impervious to most or all of these migratory materials or components and thereby shields the first substrate from these migratory components.

EXAMPLE

A tire label is prepared by coating one side of a facestock material with a barrier layer. The facestock material is a corona treated, semi-rigid, matte white polypropylene opaque film available from Avery Dennison having a MD (machine direction) tensile modulus of 250,000 psi, a CD (cross direction) tensile modulus of 90,000 psi, an elongation of 50% MD and 400% CD, and a thickness of 4.0 mils. The barrier layer is made from the following coating composition (all numerical values being in percent by weight):

| UVR-6105 | 88 |
| UVI-6974 | 9 |
| Tone 0305 | 3 |

The coating composition is spread on the facestock using a multiple roll coater. The coat weight is 3 gsm. The coating is cured using ultraviolet light under the following conditions:

| Line Speed | 600 fpm |
| Dose | 1200 watts |
| Coating Temp | 70° F. |
| Coater Roll Temp | 70° F. |
| Corona | 0.5 KW/100 fpm |

A rubber-based, tackified, hot-melt pressure-sensitive adhesive layer is applied to the barrier layer at a coat weight of 62 gsm using a die coater. A release liner consisting of a 50 lb/ream super calendered kraft backing liner coated with a thermally-cured, platinum-catalyzed silicone release layer is adhered to the adhesive layer. The release coating on the release liner is positioned between the adhesive layer and the backing liner. The resulting composite construction is slit to a width of 30.5 inches and has length of 2000 feet. The composite construction is in roll form. The roll is unwound and labels are die-cut from the composite construction. The release liner is stripped from the labels and the labels are adhered to the sidewall or tread of tires. The applied labels are characterized by the absence of swelling, distortion and discoloration.

In another embodiment, the second substrate is high energy surface such as a painted vehicle side. For instance, the second substrate may be a side of truck painted with an acrylic paint.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composite construction for use as a label or a tape comprising: a first substrate, said first substrate having a face side and an underside opposite said face side; an adhesive layer; and a barrier layer adhered to the underside of said first substrate and positioned between said first substrate and said adhesive layer, said barrier layer comprising a radiation cured cross linked cycloaliphatic epoxide derived from at least one cycloaliphatic epoxy compound, at least one polyol and at least one photoinitiator, wherein the ratio of epoxide equivalents in said cycloaliphatic epoxy compound to hydroxyl equivalents in said polyol is about 2 to about 100, and said barrier layer being substantially impervious to migratory components in said first substrate.

2. The construction of claim 1 wherein a release liner is adhered to said adhesive layer.

3. The construction of claim 2 wherein said release liner is comprised of a backing liner and a release coating adhered to one side of said backing liner, said release coating being positioned between said adhesive layer and said backing liner.

4. The construction of claim 1 wherein said composite construction is adhered to a second substrate.

5. The construction of claim 1 wherein said first substrate is comprised of a polymer film.

6. The construction of claim 1 wherein said first substrate is comprised of a polyvinyl chloride.

7. The construction of claim 1 wherein said barrier layer is cured using ultraviolet light.

8. The construction of claim 1 wherein said barrier layer further comprises a wax, a surfactant, or a combination thereof.

9. The construction of claim 1 wherein said adhesive layer is comprised of a pressure-sensitive adhesive.

10. The construction of claim 1 wherein said adhesive layer is comprised of a acrylate or methacrylate pressure-sensitive adhesive.

11. A composite comprising: a polyvinyl chloride substrate, having a face side and an underside opposite said face side; an adhesive layer; and a barrier layer adhered to the underside of said polyvinyl chloride substrate and positioned between said polyvinyl chloride substrate and said adhesive layer, said barrier layer comprising a radiation cured cross linked cycloaliphatic epoxide derived from at least one cycloaliphatic epoxy compound, at least one polyol and at least one photoinitiator, said barrier layer being substantially impervious to migratory components in said polyvinyl chloride substrate; and a release liner adhered to said adhesive layer.

* * * * *